United States Patent Office  2,881,654
Patented Apr. 14, 1959

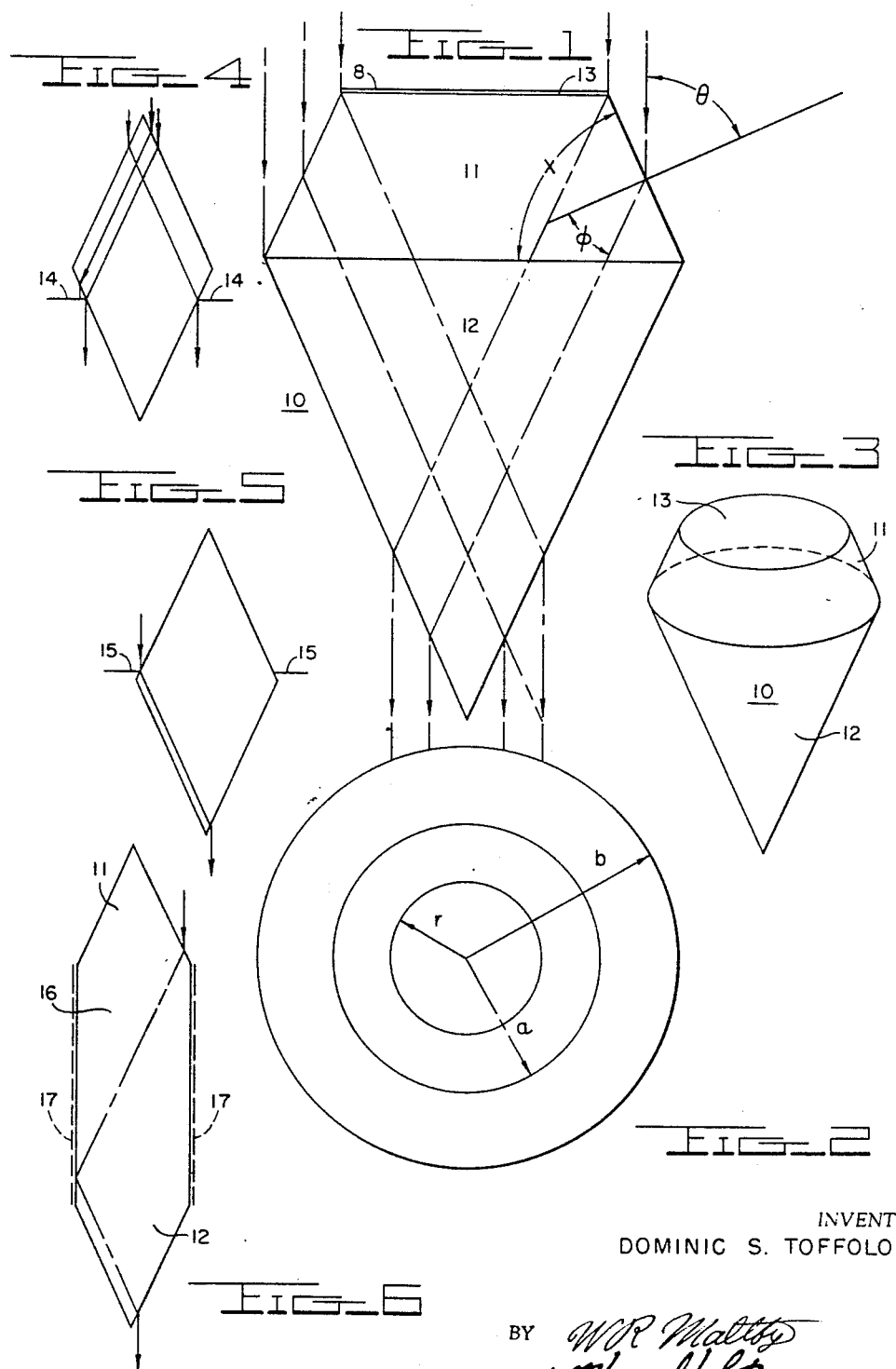

2,881,654

BICONICAL REFRACTOR

Dominic S. Toffolo, Camp Springs, Md.

Application October 24, 1955, Serial No. 542,534

2 Claims. (Cl. 88—1)

(Granted under Title 35, U.S. Code (1952), sec. 266)

The invention described herein may be manufactured and used by or for the Government of the United States of America for governmental purposes without the payment of any royalties thereon or therefor.

The present invention relates to refractors and more particularly to a refractor which passes plane parallel incident radiation of a given intensity to plane parallel radiation of greater intensity than the incident radiation.

The refractor comprises a radiation transparent medium presenting to the incident flux an annular conical surface, and having a second conical surface coaxial therewith through which the emergent flux passes. The element may be formed as two identical cones in axial alignment with bases abutting and preferably is optical contact. In this case, the entrance cone may be centrally masked to leave at its base portion an annular conical incident surface. Peripheral incident flux is refracted to concentrate centrally of the exit pupil at greatly increased intensity.

The refractor of this invention therefore affords means of increasing the intensity of an incident light source and further provides many advantages in optical and astronomical work. It may replace multi-element lenses of a telescope wherein the same telescopic effect can be obtained without the use of multiple lenses. The refractor element can be installed in front of a light signalling device to increase the intensity of the signal, and by use of materials having a specific index of refraction, increases in intensity of radio frequency radiation can be obtained where the application of optical techniques is desired, such as in antennas.

An object of the present invention is to produce an element which will afford increased emergent intensity for plane parallel electromagnetic radiation incident thereon.

A further object of this invention is to increase the intensity of incident light that passes through a refractor element.

A still further object of the present invention is to provide an optical element which will effectively replace a multiple number of expensive optical lenses now used in optical equipment.

A final object of the present invention is to provide a refractor element which can be made inexpensively as by molding or other means.

Other and more specific objects of this invention will become apparent upon a careful consideration of the following detailed description when taken together with the accompanying drawings, in which;

Fig. 1 is a side elevational view of the element of this invention illustrating the path of plane parallel light through the refractor.

Fig. 2 is a projection from Fig. 1 illustrating the relationship of the areas covered by the incident plane parallel light and the emergent light.

Fig. 3 is a perspective view illustrating a preferred geometrical configuration of the optical element of this invention.

Figs. 4, 5 and 6 diagrammatically show further embodiments of the invention.

Referring now to the drawings there is illustrated in Fig. 1 a refractor 10 which passes incident plane parallel radiation of a given intensity to an emergent plane parallel radiation of a greater intensity. The element is a solid that may be made of a single piece of glass, or other radiation transparent material. The appearance of the element is a geometrical configuration having right conical sections 11 and 12 with common bases, one of said cones (11) being truncated to form a flat end surface 13. The flat end surface is coated with a radiation absorbing material 8 to prevent radiation from entering the refractor element within the area of the flat end surface. It is obvious that instead of the end of one cone being cut away, the complete vertex and could be coated with light absorbing material otherwise masked so the entrance flux is limited to an annular zone near the base of the cone. Equally, the annular base portion of the exit conical surface could be masked instead, as shown at 14 in Fig. 4.

In many applications where precision requirements do not arise, such as systems for illuminating photocells or photosensitive crystals, the utilization device may present a sensitive area limited to the intensified exit pupil area, and in such situations an unmasked element whose entrance and exit surfaces are both complete, cones may be used. An outer radii the exit pupil of such an element presents increasingly lower intensities which may be negligible in many applications. The invention may then be used for microscope substage illumination. A peripheral incident annular diaphragm 15 in the latter application will effect dark field illumination, Fig. 5.

For many uses the refractor's active surfaces may be formed by molding in other applications, however, it is essential that the surfaces be worked to optical quality, that is, within a wavelength or less at the frequency of the radiation.

For maximum emergent radiation intensity, the angle "X" (Fig. 1) formed by the surface and a line drawn perpendicular to the axis of the optical element must be equal to the angle of incidence "$\theta$" of plane parallel light. This angle "X" must be a specific and unique angle related to the index of refraction of the material from which the refractor element is formed. For any index of refraction "N," the angle "X" which gives the greatest intensity for plane parallel incident radiation that passes through the element can be found from the formula $$\sin \theta = \frac{1+\sqrt{1+8N^2}}{4N}$$

where N is the index of refraction of the material from which the element is formed and $\theta$ is the angle of incidence for plane parallel radiation. $\theta$ is numerically equal to the angle "X." In other terms the angle $\theta$ as shown in Fig. 1 can be expressed as the angle formed by the interception of a line perpendicular to the outer surface of a cone and a line perpendicular to the base of the cone. The angle formed being equal to the angle of incidence of plane parallel radiation incident on the conical surface. It is obvious that the material from which the element is formed must have a specific index of refraction "N," which will probably be known, if not, the index of refraction may be found by use of Snell's law, $$N = \frac{\sin \theta}{\sin \phi}$$

where the element is in air, N is the index of refraction of the material, sin θ is the angle of incidence, and sin φ is the angle of refraction.

It has been determined that the element of this invention with any base angle will have an emergent intensity which is greater than the incident intensity due to the incident radiation being confined to a smaller area by refraction caused within the material of the optical element. There is a critical base angle as illustrated above which forms the surfaces of the cone in order to pass incident light which will have the greatest intensity on emerging from the optical element.

Since the element has the appearance of integral cones with the same base angles, the surface of one cone section directly opposite the surface of the other cone section will be parallel and plane parallel radiation incident on one surface of the element will be refracted parallel with the surface of the adjacent side of the other cone in such a manner that the rays will strike the opposite surface of the adjacent cone and emerge as a plane parallel beam (Fig. 1).

The incident radiation emerges from the second active refracting surface 12 with an intensity which is greater than the incident intensity. The element effects this by two refractions which are self correcting at any wavelength, thus making it archromatic. If "$b$," is the radius of the base of the cone, "$r$" is the radius of the circle of the emergent pupil, and "$a$" is the radius of the effectively masked central entrance portion of the element then the useful incident radiation is bounded by the two circles of projection (Fig. 2) having radii "$b$" and "$a$." Further, $b=a+r$.

The incident intensity has a direct relationship to the average emergent intensity and is related according to the formula $$\frac{\text{Emergent intensity}}{\text{Incident intensity}} = \frac{2b}{r} - 1$$

for maximum intensity amplification. The radius "$a$" is made such that a plane parallel incident ray striking the element at the beginning of the non-covered surface at the top portion will enter the element and be refracted toward the opposite side of the other cone shaped portion of the element. When the radiation strikes the side of the exit cone surface it will be refracted again and emerge as plane parallel rays. All of the radiation incident on the annular conical surface of the truncated cone will be refracted twice on passing through the optical element and on emerging will be confined to a smaller area whereby the intensity will be greater than at incidence.

Fig. 1 illustrates a bundle of plane parallel light rays entering the annular surface 11 and refracted toward the surface 12 wherein the rays are again refracted as parallel emergent rays. The emerging rays will be parallel with the incident rays and confined to a smaller bundle which is confined to the circle of projection having a radius of "$r$" (Fig. 2) and illustrates the usable light area after passing through the optical element.

In making an element of the present invention, the element may be made of glass, or a more readily moldable material of which there are many suitable clear plastics on the market which can be used, also, in case of use with X-rays, the element can be made of wax, such as paraffin. Elements of this invention can be used for many purposes in increasing the intensity of incident radiation and is bound by the index of refraction of the specific material which is used for the specific radiation to get the proper angle of refraction. The proper base angle of the cone shaped element is related to the index of refraction of the material used for the specific radiation and the base angle is the same as the incident angle formed by the cone surface and the incident rays, which is found according to the formula previously cited.

An element for illustrative purposes made in accordance with the present invention is formed from glass or any other material having a specific index of refraction for the specific radiation, which in this case is plane parallel light and the index of refraction is 1.4052. The element is a solid optical element which has the appearance of a right angular cone surface integral with a second right angular cone surface joined at their bases. One of said conical surfaces is truncated and the flat end surface coated with a light absorption material to prevent the entrance of incident radiation. Instead of being truncated and the flat end surface coated to prevent light entrance, the cone can be coated over the vertex end surface which would normally be cut-off if it were truncated, to provide the same effect.

The provision of an optical element for maximum increased intensity depends on the radius "$a$" across the flat end surface of the truncated cone, the radius "$b$" of the base, the base angle of the integral cone sections, and the radius "$r$" of the circle of emergent light. The relationship of the various radii being $b=a+r$, and the formula for finding the correct base angle is $$\sin \theta = \frac{1+\sqrt{1+8N^2}}{4N}$$

where the base angle is the same as the angle of incidence. From the above formula and a known index of refraction, the maximum emergent intensity can be obtained for optical elements of this invention which would be used to replace multiple lenses now used in the optical art. The optical element illustrated has a base angle of 65.1 degrees the radius "$a$" of the truncated end surface is 0.4 inch, the radius "$b$" is 1.3 inches for the base of the cone section and a radius "$r$" of 0.9 inch for the circle of emergent light. These valves make an optical element which can be used for viewing objects of great distances and can be used to replace multi-element lense devices now used in the optical art especially a telescope.

The active surfaces of the refractors so far discussed contemplate the conical bases in substantial abutment. Fig. 6 illustrates that the active surfaces may be spaced by a cylinder 17 of length equal to twice the altitude of either cone or a multiple of that length, reflectively coated externally at 17. Other intermediate spacing will affect the radial intensity distribution of the exit beam.

Obviously many modifications and variations of the present invention are possible in the light of the above teaching. It is therefore to be understood, that within the scope of the appended claims, the invention may be practiced otherwise than as specifically described.

What is claimed is:

1. A refractor for increasing the intensity of incident plane parallel radiation which comprises a solid body of radiation transparent material having first and second identical conical surfaces positioned in axial alignment with their bases abutting and with directly opposite surfaces parallel, said conical surfaces having base angles equal to the angle formed by the interception of a line perpendicular to one of said conical surfaces and a line perpendicular to the base, the latter angle formed being equal to the angle of incidence of plane parallel radiation incident on one of said conical surfaces along a line perpendicular to the base, said base angle being formed by the formula $$\sin \theta = \frac{1+\sqrt{1+8N^2}}{4N}$$

for maximum emergent intensity for plane parallel incident radiation that passes through the refractor, where θ is the angle of incidence and N is the index of refraction of the material of the refractor.

2. The structure of claim 1 further including means intercepting radiation directed at the central vertex section of one of said surfaces.

References Cited in the file of this patent

UNITED STATES PATENTS

| | | |
|---|---|---|
| 270,132 | Ross | Jan. 2, 1883 |
| 1,202,223 | Redfield | Oct. 24, 1916 |
| 2,059,033 | Rivier | Oct. 27, 1936 |
| 2,514,492 | Hayward | July 11, 1950 |
| 2,587,972 | Crise | Mar. 4, 1952 |
| 2,821,107 | Bouwers | Jan. 28, 1958 |

FOREIGN PATENTS

| | | |
|---|---|---|
| 29,282 | Great Britain | of 1909 |
| 686,268 | France | Apr. 8, 1930 |
| 714,972 | France | Sept. 14, 1931 |

OTHER REFERENCES

Optik, vol. 12, September 1955 on Theory of the Hufner-Rumbus, pages 404, 409, 410, published Wissenschaftliche Verlagsgesellschaft m.b.H.